March 19, 1929.  A. K. PEHRSON  1,706,363

PASSAGEWAY DRIVE MECHANISM FOR ARTICULATED CAR UNITS

Filed April 18, 1928  2 Sheets-Sheet 1

INVENTOR
Alfred K. Pehrson

March 19, 1929.  A. K. PEHRSON  1,706,363

PASSAGEWAY DRIVE MECHANISM FOR ARTICULATED CAR UNITS

Filed April 18, 1928   2 Sheets-Sheet 2

INVENTOR
Alfred K. Pehrson,
by G. C. Lambe,
atty.

Patented Mar. 19, 1929.

1,706,363

UNITED STATES PATENT OFFICE.

ALFRED K. PEHRSON, OF BELLEVUE, PENNSYLVANIA, ASSIGNOR TO PRESSED STEEL CAR COMPANY, OF PITTSBURGH, PENNSYLVANIA, A CORPORATION OF NEW JERSEY.

PASSAGEWAY DRIVE MECHANISM FOR ARTICULATED CAR UNITS.

Application filed April 18, 1928. Serial No. 270,918.

An object of my invention is to provide means for the proper maintenance of the openings in the passageway member of an articulated car unit with respect to the openings in the two adjacent car bodies.

Another object of my invention is to provide means on each of the adjacent car body ends for controlling the movement of the passageway member between them by the movement of the bodies themselves.

Another object of my invention is the provision of means for controlling the passageway member of an articulated car unit through movements of either one of the two adjacent car bodies.

Another object of my invention being to provide rack and gear means for controlling the movements of the passageway member by movements of the car bodies.

Figure 1:
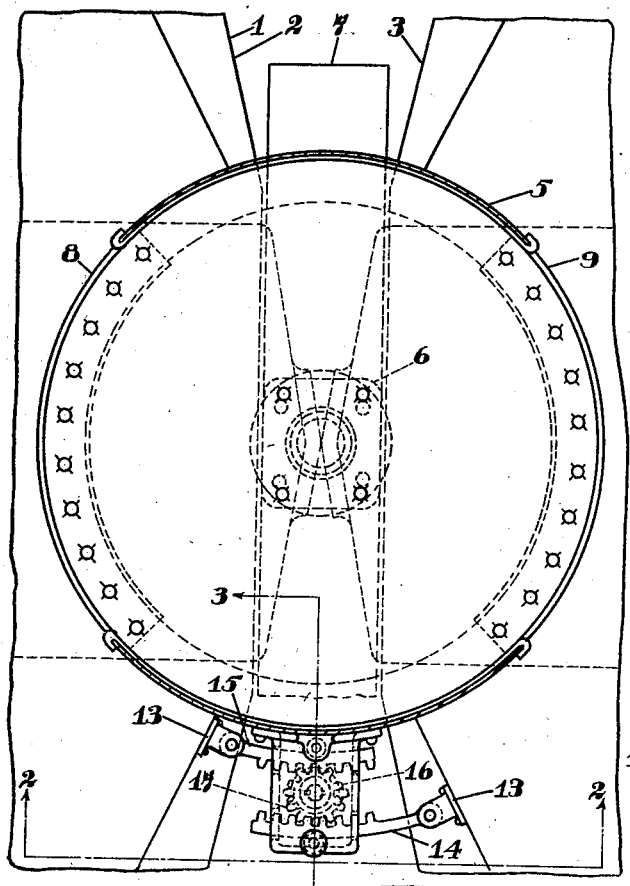
Figure 3:
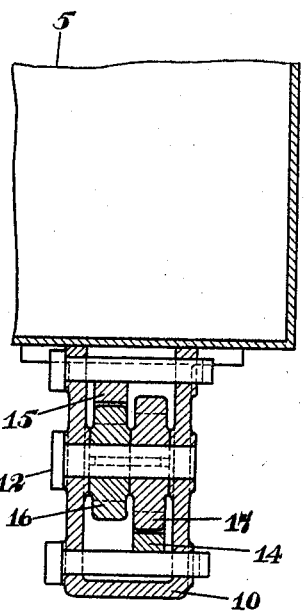
Figure 2:
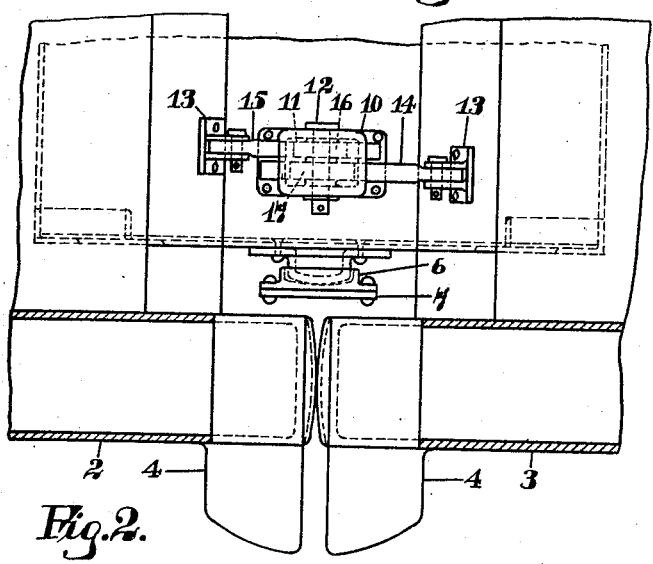
Figure 4:
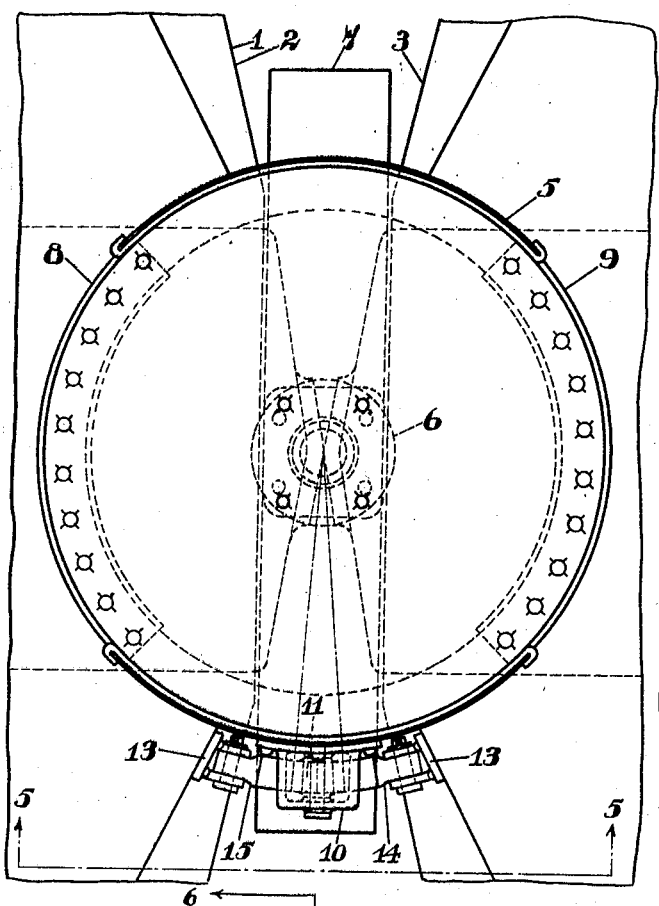
Figure 6:
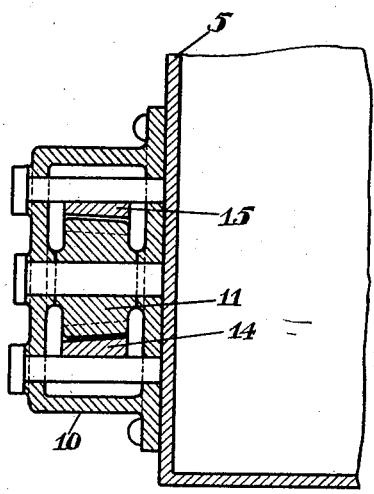
Figure 5:
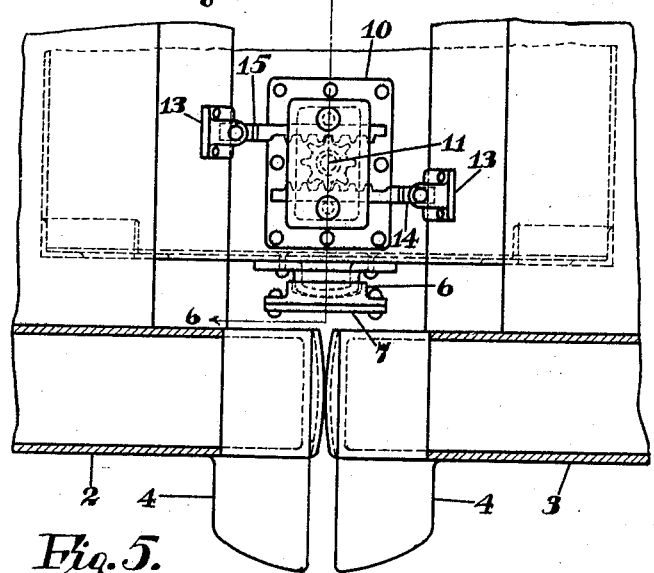

Referring now to the drawings, Fig. 1 is a plan view of a portion of an articulated car unit showing the relation of the passageway member to the ends of the two adjacent car bodies and the passageway drive mechanism; Fig. 2 is an elevation taken along the lines 2—2 of Fig. 1; Fig. 3 is an enlarged view of a portion of the passageway member and the passageway drive mechanism taken along the lines 3—3 of Fig. 1; Fig. 4 is a plan view of a portion of an articulated car unit and shows a modification of my invention; Fig. 5 is an elevation taken along the lines 5—5 of Fig. 4; Fig. 6 is an enlarged view taken along the lines 6—6 of Fig. 5.

Referring now in detail to the drawings where like reference characters refer to like parts, reference character 1 indicates an articulated car unit comprising bodies 2 and 3 supported by means of bearings 4 on a common truck (not shown). A passageway member 5 is pivotally supported between and extends into the two adjacent car bodies 2 and 3, the pivotal support for this passageway member comprising a bearing member 6 contained on a bridge member 7 which is supported by any suitable means on the common truck. In Fig. 1 the bridge member 7 is broken away at one end to more clearly show the invention, but it is to be understood that the portion broken away is similar in all respects to the opposite end which is shown. The passageway member 5 has openings 8 and 9 which communicate with similar openings in the car bodies 2 and 3, and when the passageway member openings coincide with the openings in the car body, a free and uninterrupted passage is provided to permit the passengers to move from one car to the other. At one side of the passageway member is a housing member 10 which contains and supports a pinion member 11 secured to the pin 12 which is freely rotatable in the housing. Attached to each one of the adjacent car bodies by means of brackets 13 are arms 14 and 15 which are gear segments. The pinion member 11 is composed of two segmental pinions 16 and 17 which have teeth on only a portion of their periphery and are securely attached to the pin 12 by means of a key and are thus made to revolve as a unit. The arm 15 attached to the car body 2 is rotatably mounted in the bracket 13 and passes through an opening in the housing member 10 to engage the upper pinion segment 16 and the arm 14 secured to the body 3 is similarly mounted and passes through the housing to engage the lower pinion segment 17.

When the articulated car unit is moving along a straight portion of the track and the adjacent ends of the adjacent car bodies maintain the same position relative to each other, the arms 14 and 15 attached to the car bodies and in engagement with the pinion 11, maintain the passageway member in a fixed relation to the adjacent car bodies, and thus provide a free and uninterrupted passage for use of the passengers when moving from one car to the other.

When, however, the articulated car unit enters a curved portion of a track, and one of the bodies is rounding the curve while the other car body is still on the straight portion of the track, the turning car body will move the arm attached to it either towards or away from the adjacent car body depending on the direction of the turning. When such a condition exists the moving arm in contact with one of the pinion segments of the pinion 11 will cause the pinion 11 to rotate and move along the non-moving arm secured to the other car body, this movement of the opinion will carry the passageway member along with it causing the passageway member to rotate in its pivotal support 6. As will be seen by an inspection of the drawings, the pitch diameter of the gear segments composing the arms is larger than the pitch diameter of the pinion segments attached to the passageway member and the turning of the passageway member will thus be proportionately less than the angle through which the turning car body moves. In this manner the openings 8 and 9 of the passageway member will proportion the movement of the opening in the one car body 3 between the two car bodies and maintain a free and uninterrupted passageway between them.

When both car bodies are traversing the curved portion of the track, and both car bodies are simultaneously displaced a like amount from the position they had to each other on a straight portion of the track, the arms attached to the ends of the turning car body will either move toward or away from each other at a constant rate and the subsequent turning of the pinion 11 in its housing will serve to maintain the passageway member so as to again proportion the movement between the two car bodies and maintain a free and uninterrupted passageway between them.

From the foregoing description and inspection of the drawings it will be readily apparent how the passageway member will operate regardless of the movement of one adjacent car body relative to the other.

In the modification of my invention, as shown by Figs. 4, 5 and 6, the spur pinion segments are displaced by a beveled pinion and the arms attached to the car bodies are placed one above the other in their engagement with the pinion and the subsequent movements of the passageway member as caused by the movement of the adjacent ends of the adjacent car bodies is similar to that previously described.

Having thus described the invention what I claim as new and desire to secure by Letters Patent is:

1. In an articulated car unit, a passageway member, a passageway drive mechanism, said mechanism comprising members mounted on the ends of the adjacent car bodies and rotatable longitudinally of the passageway member and engaging a member rotatably mounted on the passageway member.

2. In an articulated car unit, a passageway member, a passageway drive mechanism, said mechanism comprising members mounted on the ends of the car bodies adjacent the passageway member and engaging a pinion member mounted on the side of the passageway member.

3. The combination in an articulated car unit of adjacent ends of adjacent car bodies supported on a common truck, a passageway member pivotally supported between and extending into said bodies, rotatably mounted gear segments on the car bodies engaging a pinion member mounted on the passageway member.

4. The combination in an articulated car unit of a passageway member pivotally supported between and extending into the adjacent car bodies and a passageway drive mechanism, said mechanism comprising a rack pivotally mounted on each of the adjacent ends of adjacent car bodies engaging a bevel pinion member mounted on the side of said passageway member.

5. In an articulated car unit, a hollow cylindrical passageway member pivotally supported between and extending into the adjacent ends of the adjacent car bodies, a passageway drive mechanism, said mechanism comprising a rotatably mounted member on the side of said passageway member engaged by members pivotally mounted on the ends of adjacent car bodies, said body members having opposing movements in a direction transversely of the passageway member when said bodies are turned relative to each other.

6. In an articulated car unit, a passageway member between the adjacent car bodies, a rotatably mounted member on the side of the passageway member, pivotally mounted members on the ends of the adjacent car bodies engaging the rotatably mounted member on the passageway member, and means on said passageway for maintaining the rotatably mounted body members in contact with the member mounted on the passageway member.

In testimony whereof I affix my signature.

ALFRED K. PEHRSON.